United States Patent
Suzuki et al.

(10) Patent No.: US 10,815,905 B2
(45) Date of Patent: Oct. 27, 2020

(54) FUEL CONTROL METHOD FOR GAS TURBINE, CONTROL DEVICE FOR EXECUTING SAID METHOD, AND GAS TURBINE INSTALLATION PROVIDED WITH SAID CONTROL DEVICE

(71) Applicant: MITSUBISHI HITACHI POWER SYSTEMS, LTD., Kanagawa (JP)

(72) Inventors: Hiroki Suzuki, Yokohama (JP); Yasutsugu Takata, Yokohama (JP); Yoshiaki Nakanishi, Yokohama (JP); Masayuki Murakami, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 549 days.

(21) Appl. No.: 15/305,484

(22) PCT Filed: Apr. 30, 2015

(86) PCT No.: PCT/JP2015/062919
§ 371 (c)(1),
(2) Date: Oct. 20, 2016

(87) PCT Pub. No.: WO2015/182327
PCT Pub. Date: Dec. 3, 2015

(65) Prior Publication Data
US 2017/0044994 A1    Feb. 16, 2017

(30) Foreign Application Priority Data

May 26, 2014    (JP) .................................. 2014-108088

(51) Int. Cl.
*F02C 9/28*    (2006.01)
*F02C 9/32*    (2006.01)

(52) U.S. Cl.
CPC .................. *F02C 9/28* (2013.01); *F02C 9/32* (2013.01); *F05D 2220/32* (2013.01);
(Continued)

(58) Field of Classification Search
CPC .......... F02C 9/28; F02C 9/32; F05D 2270/02; F05D 2270/021; F05D 2270/022;
(Continued)

(56) References Cited

U.S. PATENT DOCUMENTS

| 5,966,925 A * | 10/1999 | Torikai ...................... F02C 7/26 60/778 |
| 6,230,479 B1 * | 5/2001 | Kawamura ............... F02C 9/26 60/773 |

(Continued)

FOREIGN PATENT DOCUMENTS

| JP | 2002-4889 | 1/2002 |
| JP | 3872406 | 1/2007 |

(Continued)

OTHER PUBLICATIONS

International Search Report dated Aug. 11, 2015 in International Application No. PCT/JP2015/062919.
(Continued)

*Primary Examiner* — Gerald L Sung
*Assistant Examiner* — Jacek Lisowski
(74) *Attorney, Agent, or Firm* — Wenderoth, Lind & Ponack, L.L.P.

(57) ABSTRACT

A control device includes a fuel equivalent value calculation unit for determining the flow rate of fuel supplied to a gas turbine in accordance with a target value deviation between an actual rotation speed and a target rotation speed, an upper
(Continued)

limit deviation calculation unit for obtaining an upper limit deviation which is a deviation between a set upper limit output and an actual output, a lower limit deviation calculation unit for obtaining a lower limit deviation which is a deviation between a set lower limit output and the actual output, and a parameter-changing unit for changing any one parameter among the target rotation speed, the actual rotation speed, and the target value deviation so that the target value deviation decreases when the actual rotation speed decreases and the upper limit deviation is small, and so that the target value deviation increases when the actual rotation speed increases and the lower limit deviation is small.

15 Claims, 6 Drawing Sheets

(52) U.S. Cl.
CPC .... *F05D 2270/02* (2013.01); *F05D 2270/021* (2013.01); *F05D 2270/022* (2013.01); *F05D 2270/024* (2013.01); *F05D 2270/304* (2013.01); *F05D 2270/701* (2013.01)

(58) Field of Classification Search
CPC ......... F05D 2270/024; F05D 2270/304; F05D 2270/701
See application file for complete search history.

(56) References Cited

U.S. PATENT DOCUMENTS

| | | |
|---|---|---|
| 2010/0198419 A1 | 8/2010 | Sonoda et al. |
| 2013/0147208 A1 | 6/2013 | Kishi et al. |
| 2015/0315928 A1* | 11/2015 | Sopcic .................. F01D 17/06 60/702 |

FOREIGN PATENT DOCUMENTS

| | | |
|---|---|---|
| JP | 3887777 | 2/2007 |
| WO | 2009/060889 | 5/2009 |
| WO | 2012/073886 | 6/2012 |

OTHER PUBLICATIONS

Written Opinion of the International Searching Authority dated Aug. 11, 2015 in International Application No. PCT/JP2015/062919.

* cited by examiner

FUEL CONTROL METHOD FOR GAS TURBINE, CONTROL DEVICE FOR EXECUTING SAID METHOD, AND GAS TURBINE INSTALLATION PROVIDED WITH SAID CONTROL DEVICE

TECHNICAL FIELD

The present invention relates to a fuel control method for a gas turbine, a control device that executes this method, and a gas turbine installation that is provided with this control device. Priority is claimed on Japanese Patent Application No. 2014-108088 filed on May 26, 2014, the content of which is incorporated herein by reference.

BACKGROUND ART

Stabilizing the gas turbine rotation speed is important during a gas turbine operation. According to a technique that is disclosed in the following PTL 1, a target rotation speed of a gas turbine is determined based on a deviation between an actual output of the gas turbine and a target output of the gas turbine. According to this technique, a gas turbine rotation speed is stabilized with a flow rate of fuel that is supplied to the gas turbine determined in accordance with a deviation between the target rotation speed and an actual rotation speed of the gas turbine.

CITATION LIST

Patent Literature

[PTL 1] Japanese Patent No. 3887777

SUMMARY OF INVENTION

Technical Problem

According to the technique that is disclosed in PTL 1, a decrease in the actual rotation speed in a case where, for example, the actual output at the present point in time is close to a set upper limit output of the gas turbine results in an increase in the deviation between the target rotation speed and the actual rotation speed. This might cause the fuel flow rate to increase and the actual output to exceed the set upper limit output.

In addition, according to the technique that is disclosed in PTL 1, an increase in the actual rotation speed in a case where, for example, the actual output at the present point in time is close to a set lower limit output of the gas turbine results in a decrease in the deviation between the target rotation speed and the actual rotation speed. This might cause the fuel flow rate to decrease and the set lower limit output to exceed the actual output.

In other words, the technique that is disclosed in PTL 1 has a problem in the form of the actual output deviating in some cases from a set output range determined with respect to the gas turbine.

An object of the present invention is to provide a technique with which a gas turbine rotation speed can be stabilized and a deviation of an actual output with respect to a set output range can be suppressed at the same time.

Solution to Problem

A control device for a gas turbine as an aspect of the present invention for achieving the object described above includes a target value output unit outputting a target value equivalent to a target rotation speed of the gas turbine, a target value deviation calculation unit obtaining a target value deviation, the target value deviation being a deviation of the target value with respect to an actual rotation speed equivalent value equivalent to an actual rotation speed of the gas turbine, a fuel equivalent value calculation unit determining a fuel equivalent value equivalent to a flow rate of fuel supplied to the gas turbine in accordance with the target value deviation, a rotation speed variation detecting unit detecting a variation of the actual rotation speed of the gas turbine, an upper limit deviation calculation unit obtaining an upper limit deviation, the upper limit deviation being a deviation of a set upper limit output of the gas turbine with respect to an actual output of the gas turbine, a lower limit deviation calculation unit obtaining a lower limit deviation, the lower limit deviation being a deviation of the actual output of the gas turbine with respect to a set lower limit output of the gas turbine, and a parameter-changing unit changing any one parameter among the target value, the actual rotation speed equivalent value, and the target value deviation such that the target value deviation decreases in a case where the actual rotation speed equivalent value decreases and a previously determined value exceeds the upper limit deviation and that the target value deviation increases in a case where the actual rotation speed equivalent value increases and a previously determined value exceeds the lower limit deviation.

In this control device, the fuel equivalent value that is equivalent to the fuel flow rate is determined in accordance with the target value deviation, which is the deviation between the target value equivalent to the target rotation speed and the actual rotation speed equivalent value equivalent to the actual rotation speed, and thus the rotation speed of the gas turbine can be stabilized.

A decrease in the actual rotation speed in a case where the actual output at the present point in time is close to the set upper limit output of the gas turbine results in an increase in the target value deviation as the deviation between the target value and the actual rotation speed equivalent value. This might cause the fuel flow rate to increase and the actual output to exceed the set upper limit output. An increase in the actual rotation speed in a case where the actual output at the present point in time is close to the set lower limit output of the gas turbine results in a decrease in the target value deviation as the deviation between the target value and the actual rotation speed equivalent value. This might cause the fuel flow rate to decrease and the set lower limit output to exceed the actual output.

In this control device, however, the parameter-changing unit changes any one parameter among the target value, the actual rotation speed equivalent value, and the target value deviation, such that the target value deviation decreases, in a case where the actual rotation speed has decreased when the actual output of the gas turbine is close to the set upper limit output. Accordingly, an increase in the target value deviation can be suppressed, or the target value deviation can be decreased, even in the case of an increase in the target value deviation resulting from a decrease in the actual rotation speed equivalent value. Accordingly, in this control device, the possibility of the actual output exceeding the set upper limit output can be reduced even in a case where the actual rotation speed has decreased when the actual output of the gas turbine is close to the set upper limit output.

In addition, in this control device, the parameter-changing unit changes any one parameter among the target value, the actual rotation speed equivalent value, and the target value deviation, such that the target value deviation increases, in a case where the actual rotation speed has increased when the actual output of the gas turbine is close to the set lower limit output. Accordingly, a decrease in the target value deviation can be suppressed, or the target value deviation can be increased, even in the case of a decrease in the target value deviation resulting from an increase in the actual rotation speed equivalent value. Accordingly, in this control device, the possibility of the set lower limit output exceeding the actual output can be reduced even in a case where the actual rotation speed has increased when the actual output of the gas turbine is close to the set lower limit output.

In the control device tor a gas turbine described above, the parameter-changing unit may include a multiplier multiplying the target value deviation by a proportional gain, and a gain changing unit decreasing the proportional gain in a case where the actual rotation speed equivalent value decreases and a previously determined value exceeds the upper limit deviation and increasing the proportional gain in a case where the actual rotation speed equivalent value increases and a previously determined value exceeds the lower limit deviation.

In the control device for a gas turbine according to any one of the above, the target value output unit may include an output deviation calculator obtaining an output deviation, the output deviation being a deviation of the actual output of the gas turbine with respect to a target output of the gas turbine, and a target value calculator obtaining the target value equivalent to the target rotation speed based on the output deviation.

In the control device for a gas turbine that includes the output deviation calculator, the target value Output unit may further include a target output limiting unit outputting a smaller one of the set upper limit output and the target output which is a larger one of the previously received target output of the gas turbine and the set lower limit output, to the output deviation calculator as a target output.

The control device for a gas turbine according to any one of the above may further include a valve control unit creating a valve opening degree command in accordance with the fuel equivalent value determined by the fuel equivalent value calculation unit and outputting the valve opening degree command to a fuel regulation valve regulating the flow rate of the fuel supplied to the gas turbine.

A gas turbine installation as an aspect of the present invention for achieving the object described above includes the control device that has the valve control unit, the fuel regulation valve, and the gas turbine.

A fuel control method for a gas turbine as an aspect of the present invention for achieving the object described above includes a target value output step of outputting a target value equivalent to a target rotation speed of the gas turbine, a target value deviation calculation step of obtaining a target value deviation, the target value deviation being a deviation of the target value with respect to an actual rotation speed equivalent value equivalent to an actual rotation speed of the gas turbine, a fuel equivalent value calculation step of determining a fuel equivalent value equivalent to a flow rate of fuel supplied to the gas turbine in accordance with the target value deviation, a rotation speed variation detection step of detecting a variation of the actual rotation speed of the gas turbine, an upper limit deviation calculation step of obtaining an upper limit deviation, the upper limit deviation being a deviation of a set upper limit output of the gas turbine with respect to an actual output of the gas turbine, a lower limit deviation calculation step of obtaining a lower limit deviation, the lower limit deviation being a deviation of the actual output of the gas turbine with respect to a set lower limit output of the gas turbine, and a parameter-changing step of changing any one parameter among the target value, the actual rotation speed equivalent value, and the target value deviation such that the target value deviation decreases in a case where the actual rotation speed equivalent value decreases and a previously determined value exceeds the upper limit deviation and that the target value deviation increases in a case where the actual rotation speed equivalent value increases and a previously determined value exceeds the lower limit deviation.

In the fuel control method for a gas turbine described above, the parameter-changing step may include a multiplication step of multiplying the target value deviation by a proportional gain, and a gain changing step of decreasing the proportional gain in a case where the actual rotation speed equivalent value decreases and a previously determined value exceeds the upper limit deviation and increasing the proportional gain in a case where the actual rotation speed equivalent value increases and a previously determined value exceeds the lower limit deviation.

In the fuel control method for a gas turbine according to any one of the above, the target value output step may include an output deviation calculation step of obtaining an output deviation, the output deviation being a deviation between the actual output of the gas turbine and a target output of the gas turbine, and a target value calculation step of obtaining the target value equivalent to the target rotation speed based on the output deviation.

In the fuel control method for a gas turbine including the output deviation calculation step described above, the target value output step may further include a target output limiting step of outputting a smaller one of the set upper limit output end the target output which is a larger one of the previously received target output of the gas turbine and the set lower limit output, as a target output, and the output deviation, which is the deviation between the target output output in the target output limiting step and the actual output of the gas turbine, may be obtained in the output deviation calculation step.

The fuel control method for a gas turbine according to any one of the above may further include a valve control step of creating a valve opening degree command in accordance with the fuel equivalent value determined in the fuel equivalent value calculation step and outputting the valve opening degree command to a fuel regulation valve regulating the flow rate of the fuel supplied to the gas turbine.

Advantageous Effects of Invention

According to the aspect of the present invention, a deviation of the actual output from a set output range can be suppressed and the rotation speed of the gas turbine can be stabilized at the same time.

DESCRIPTION OF EMBODIMENTS

Figure 1:
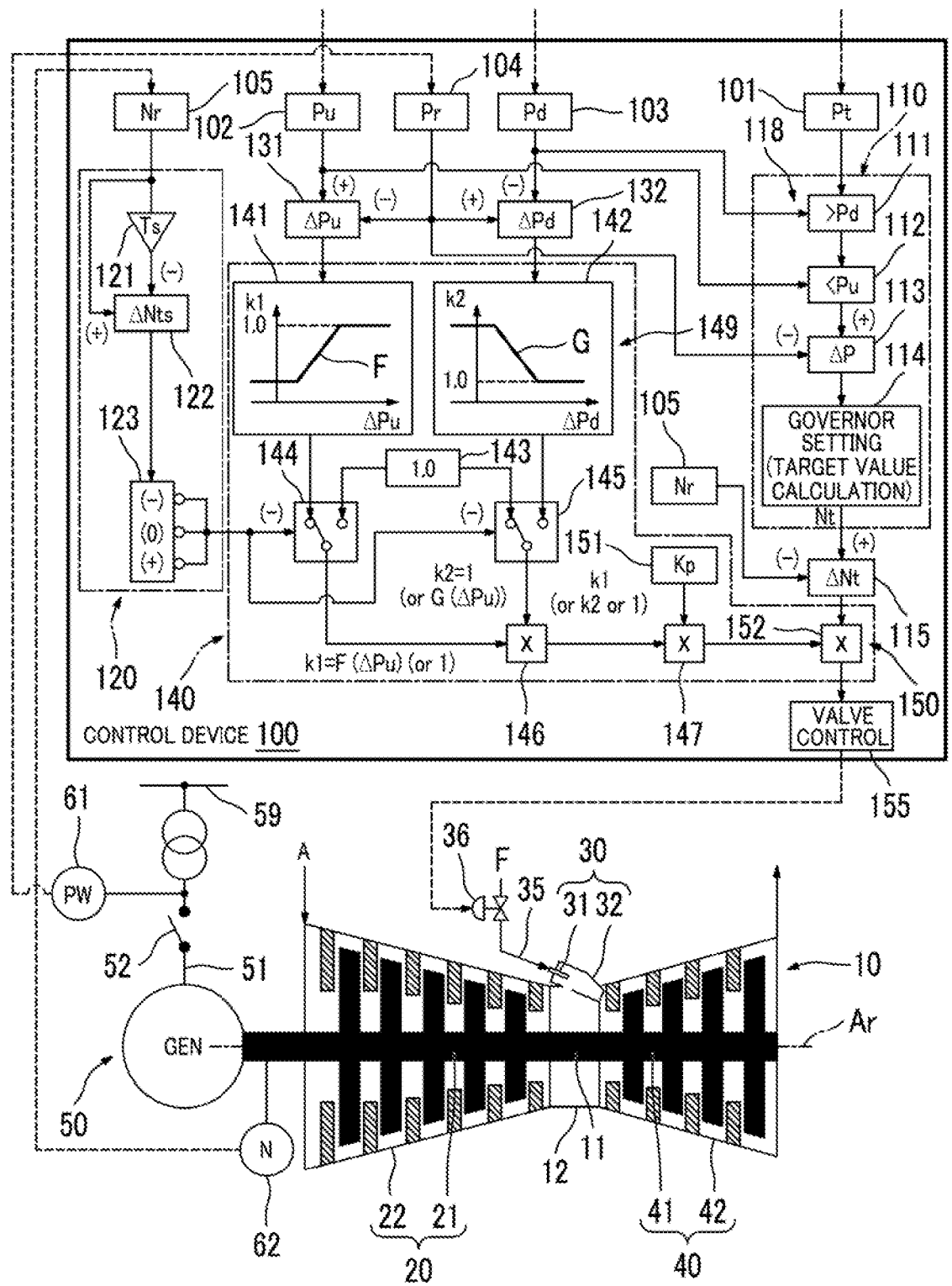
FIG. 1 is an explanatory diagram (1) illustrating a configuration of a gas turbine and a functional configuration of a control device according to an embodiment of the present invention.

Hereinafter, an embodiment and various modification examples of a gas turbine installation according to the present invention will be described with reference to accompanying drawings.

Embodiment

An embodiment of the gas turbine installation according to the present invention will be described with reference to FIGS. 1 to 5.

The gas turbine installation according to this embodiment is provided with a gas turbine 10, a generator 50 that generates electric power by driving of the gas turbine 10, a fuel supply line 35 that supplies fuel F to the gas turbine 10, a fuel regulation valve 36 that regulates the flow rate of the fuel F which flows through the fuel supply line 33, and a control device 100 that controls the fuel regulation valve 36.

The gas turbine 10 is provided with a compressor 20 that compresses air, a combustor 30 that generates combustion gas by burning the fuel F in the air compressed by the compressor 20, and a turbine 40 that is driven by using the high-temperature and high-pressure combustion gas.

The compressor 20 has a compressor rotor 21 that rotates about an axis Ar and a compressor casing 22 that covers the compressor rotor 21 in a rotatable manner. The turbine 40 has a turbine rotor 41 that is rotated about the axis Ar by the combustion gas from the combustor 30 and a turbine casing 42 that covers the turbine rotor 41 in a rotatable manner. The turbine rotor 41 and the compressor rotor 21 rotate about the same axis Ar, are connected to each other, and form a gas turbine rotor 11. A rotor of the generator 50 is connected to the gas turbine rotor 11. In addition, the compressor casing 22 and the turbine casing 42 form a gas turbine casing 12 by being connected to each other.

The combustor 30 is provided with a combustion liner (or transition piece) 32 that sends the combustion gas into a combustion gas flow path of the turbine 40 and a nozzle 31 that injects the fuel into the combustion liner 32. The fuel supply line 35 is connected to the nozzle 31.

The generator 50 and an electric power system 50 are electrically connected by an electric power cable 51. A breaker 52 that performs electrical connection and disconnection between the generator 50 and the electric power system 59 and an output meter 61 that detects a gas turbine output, which is the electric power output from the generator 50, are disposed on the electric power cable 51. In addition, the rotor of the generator 50 or the gas turbine rotor 11 has a rotation speed meter 62 disposed thereon to detect a rotation speed N thereof.

The control device 100 has a target output receiving unit 101 that receives a target output Pt of the gas turbine 10 from the outside, an upper limit output receiving unit 102 that receives a previously determined set upper limit output Pu as an upper limit output of the gas turbine 10, a lower limit output receiving unit 103 that receives a previously determined set lower limit output Pd as a lower limit output of the gas turbine 10, an actual output receiving unit 104 that receives an actual output Pr, which is an output of the gas turbine 10 detected by the output meter 61, and an actual rotation speed receiving unit 105 that receives an actual rotation speed Nr, which is a rotation speed of the gas turbine 10 detected by the rotation speed meter 62. In addition, the control device 100 has a target value output unit 110 that outputs a target rotation speed Nt (target value) of the gas turbine 10, a target value deviation calculation unit 115 that obtains a target rotation speed deviation ΔNt (target value deviation), which is a deviation of the target rotation speed Nt (target value) with respect to the actual rotation speed Nr (actual rotation speed equivalent value), a rotation speed variation detecting unit 120 that detects a variation of the actual rotation speed Nr, an upper limit deviation calculation unit 131 that obtains an upper limit deviation ΔPu, which is a deviation of the set upper limit output Pu with respect to the actual output Pr, a lower limit deviation calculation unit 132 that obtains a lower limit deviation ΔPd, which is a deviation of the actual output Pr with respect to the set lower limit output Pd, a parameter-changing unit 140 that changes the target rotation speed deviation ΔNt, a fuel equivalent value calculation unit 150 that determines the flow rate (fuel equivalent value) of the fuel supplied to the gas turbine 10 in accordance with the target rotation speed deviation ΔNt, and a valve control unit 155 that outputs a valve opening degree command in accordance with the fuel flow rate (fuel equivalent value) to the fuel regulation valve 36.

The target value output unit 110 has a target output limiting unit 118 that limits a range of the target output Ft received by the target output receiving unit 101, an output deviation calculator 113 that obtains an output deviation ΔP, which is a deviation of the target output Pt limited by the target output limiting unit 118 with respect to the actual output Pr, and a governor setter (target value calculator) 114 that determines the above-described target rotation speed Nt based on the output deviation ΔP. The target output limiting unit 118 has a lower limit limiter 111 that outputs the larger one of the target output Pt received by the target output receiving unit 101 and the set lower limit output Pd as the target output Pt, and an upper limit limiter 112 that outputs the smaller one of the target output Pt output from the lower limit limiter 111 and the set upper limit output Pu as the target output Pt. The governor setter 114 obtains the target rotation speed Nt in accordance with the output deviation ΔP by using an arbitration rate showing a rotation speed-output relationship or the like.

The rotation speed variation detecting unit 120 has a delayer 121 that outputs the actual rotation speed Hr from the actual rotation speed receiving unit 105 after a delay of a predetermined period of time, a rotation speed variation amount calculator 122 that obtains a deviation ΔNts of the actual rotation speed Nr from the actual rotation speed receiving unit 105 with respect to the actual rotation speed Nr from the delayer 121, and a variation determination unit 123 that outputs any one of rotation speed increase (+), rotation speed decrease (−), and no variation (0) in accordance with the deviation ΔNts obtained by the rotation speed variation amount calculator 122. The variation determination unit 123 outputs the rotation speed increase (+) in a case where the deviation ΔNts exceeds a previously determined positive value. The variation determination unit 123 outputs the rotation speed decrease (−) in a case where a previously determined negative value exceeds the deviation ΔNts. The variation determination unit 123 outputs the no variation (0) in a case where the deviation ΔNts is within the range from the previously determined negative value to the previously determined positive value.

The parameter-changing unit 140 has a proportional gain generator 151 that generates a proportional gain Kp, a gain multiplier 152 that multiplies the target rotation speed deviation ΔNt by a correction value of the proportional gain Kp, and a gain changing unit 149 that changes the proportional gain Kp. The gain changing unit 149 has a first correction coefficient generator 141 that obtains a first correction coefficient k1 of the proportional gain Kp in accordance with the upper limit deviation ΔPu by using a first function F, a second correction coefficient generator 142 that obtains a second correction coefficient k2 of the proportional gain Kp in accordance with the lower limit deviation ΔPd by using a second function G, and a fixed coefficient generator 143 that generates a fixed coefficient (=1) as the first correction coefficient k1 and the second correction coefficient k2. In addition, the gain changing unit 149 has a first selector 144 that outputs either the first correction coefficient k1 from the first correction coefficient generator 141 or the fixed coefficient from the fixed coefficient generator 143 as the first correction coefficient k1, a second selector 145 that outputs either the second correction coefficient k2 from the second correction coefficient generator 142 or the fixed coefficient from the fixed coefficient generator 143 as the second correction coefficient k2, a first multiplier 146 that multiplies the first correction coefficient k1 output from the first selector 144 and the second correction coefficient k2 output from the second selector 145, and a second multiplier 147 that multiplies the proportional gain Kp from the proportional gain generator 151 and a correction coefficient from the first multiplier 146.

Figure 3:
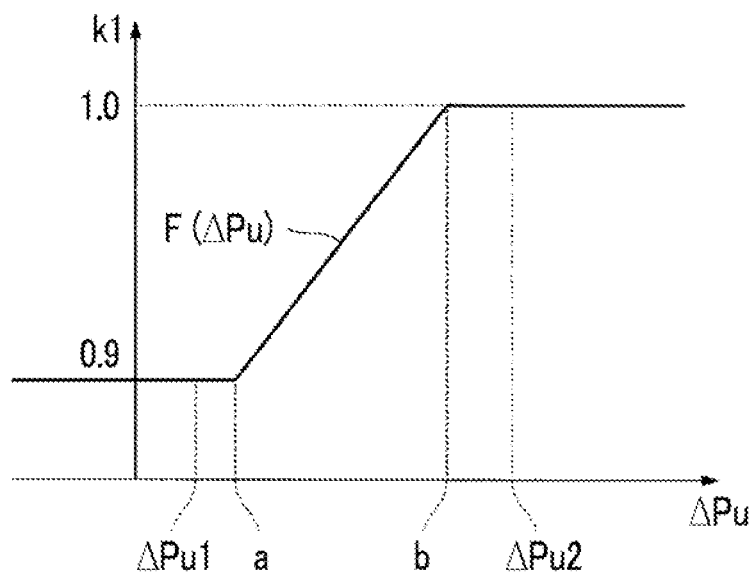
FIG. 3 is a graph illustrating a relationship between an upper limit deviation and a first correction coefficient according to the embodiment of the present invention.

The first correction coefficient generator 141 obtains the first correction coefficient k1 with respect to the upper limit deviation ΔPu obtained by the upper limit deviation calculation unit 131 by using the first function F, which shows a relationship between the upper. limit deviation ΔPu and the first correction coefficient k1. As illustrated in FIG. 3, the first function F is a function that outputs "0.9" or the like as the value of the first correction coefficient k1 in a case where the upper limit deviation ΔPu is equal to or less than a positive first value a and outputs "1.0" or the like as the value of the first correction coefficient k1 in a case where the upper limit deviation ΔPu is equal to or greater than a positive second value b (>first value a). In addition, the first function F is a function that outputs a value which increases toward "1.0" in line with an increase in the upper limit deviation ΔPu as the value of the first correction coefficient k1 in a case where the upper limit deviation ΔPu is between the first value a and the second value b. Accordingly, the first correction coefficient generator 141 outputs a value that is less than "1.0" as the first correction coefficient k1 in the case of a small upper limit deviation ΔPu1 and outputs "1.0" as the first correction coefficient k1 in the case of a large upper limit deviation ΔPu2.

Figure 4:
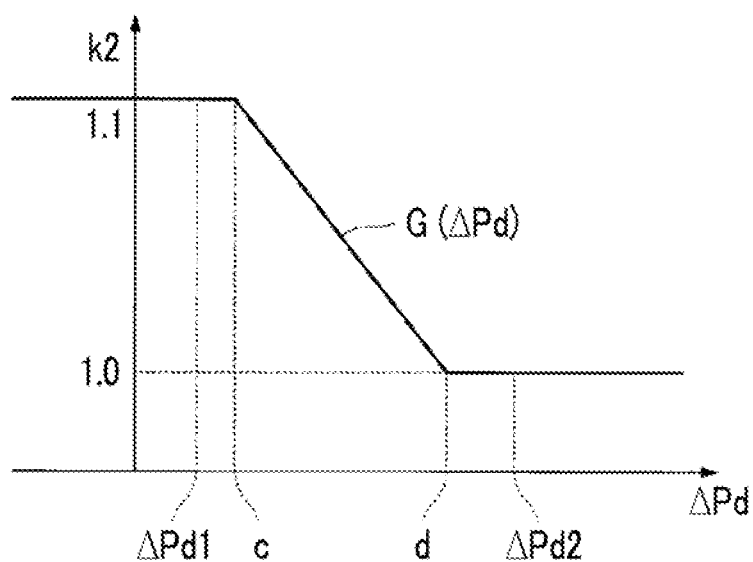
FIG. 4 is a graph illustrating a relationship between a lower limit deviation and a second correction coefficient according to the embodiment of the present invention.

The second correction coefficient generator 142 obtains the second correction coefficient k2 with respect to the lower limit deviation ΔPd obtained by the lower limit deviation calculation unit 132 by using the second function G, which shows a relationship between the lower limit deviation ΔPd and the second correction coefficient k2. As illustrated in FIG. 4, the second function G is a function that outputs "1.1" or the like as the value of the second correction coefficient k2 in a case where the lower limit deviation ΔPd is equal to or less than a positive third value c and outputs "1.0" or the like as the value of the second correction coefficient k2 in a case where the lower limit deviation ΔPd is equal to or greater than a positive fourth value d (>third value c). In addition, the second function G is a function that outputs a value which decreases toward "1.0" in line with an increase in the lower limit deviation ΔPd as the value of the second correction coefficient k2 in a case where the lower limit deviation ΔPd is between the third value c and the fourth value d. Accordingly, the second correction coefficient generator 142 outputs a value that is greater than as the second correction coefficient k2 in the case of a small lower limit deviation ΔPd1 and outputs "1.0" as the second correction coefficient k2 in the case of a large lower limit deviation ΔPd2.

Figure 2:
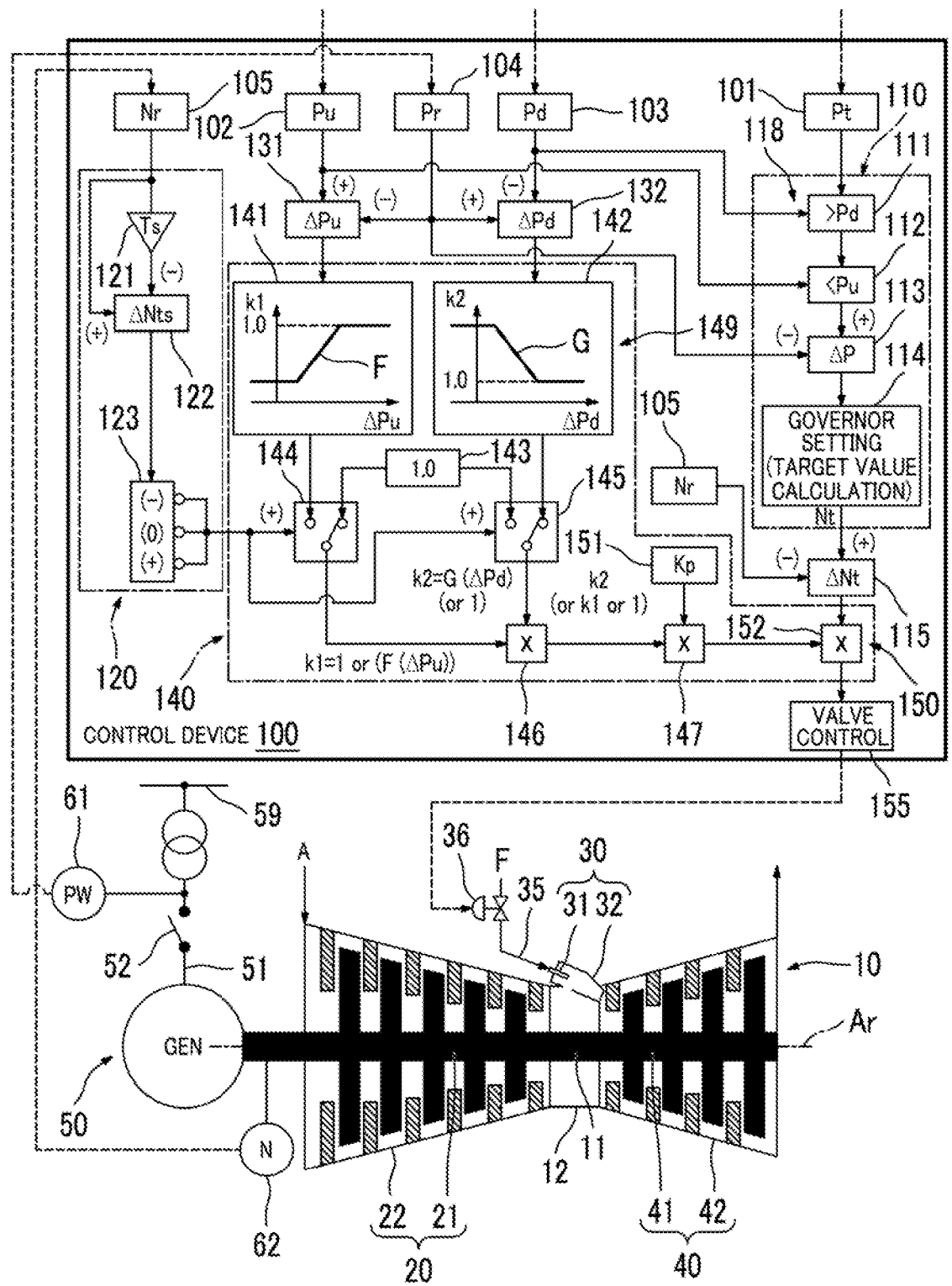
FIG. 2 is an explanatory diagram (2) illustrating the configuration of the gas turbine and the functional configuration of the control device according to the embodiment of the present invention.

After receiving the rotation speed decrease (−) from the variation determination unit 123 of the rotation speed variation detecting unit 120, the first selector 144 outputs the first correction coefficient k1 from the first correction coefficient generator 141. As illustrated in FIG. 2, the first selector 144 outputs the fixed coefficient "1.0" from the fixed coefficient generator 143 as the first correction coefficient k1 after receiving the rotation speed increase (+) or the no variation (0) from the variation determination unit 123.

As illustrated in FIG. 2, the second selector 145 outputs the second correction coefficient k2 from the second correction coefficient generator 142 after receiving the rotation speed increase (+) from the variation determination unit 123 of the rotation speed variation detecting unit 120. As illustrated in FIG. 1, the second selector 145 outputs the fixed coefficient "1.0" from the fixed coefficient generator 143 as the second correction coefficient k2 after receiving the rotation speed decrease (−) or the no variation (0) from the variation determination unit 123.

As described above, the first multiplier 146 multiplies the first correction coefficient k1 output from the first selector 144 and the second correction coefficient k2 output from the second selector 145.

The second multiplier 147 multiplies the proportional gain Kp from the proportional gain generator 151 and the correction coefficient from the first multiplier 146 and passes a result of the multiplication to the gain multiplier 152 as the corrected proportional gain Kp.

The fuel equivalent value calculation unit 150 has the proportional gain generator 151 and the gain multiplier 152 that outputs the flow rate (fuel equivalent value) of the fuel supplied to the gas turbine 10. The gain multiplier 152 multiplies the corrected proportional gain Kp and the target rotation speed deviation ΔNt and outputs a result of the multiplication as the flow rate (fuel equivalent value) of the fuel supplied to the gas turbine 10. In this embodiment, the proportional gain generator 151 and the gain multiplier 152 are components constituting the parameter-changing unit 140 as well as the fuel equivalent value calculation unit 150.

An operation of the gas turbine 10 described above will be described below.

The compressor 20 suctions and compresses atmospheric air A. Both the air compressed by the compressor 20 and the fuel F from the nozzle 31 of the combustor 30 are injected into the combustion liner 32 of the combustor 30. The fuel F becomes the combustion gas by being burned in the air. The combustion gas is discharged from the turbine 40 after flowing through the combustion gas flow path of the turbine 40 from the combustion liner 32. The turbine rotor 41 is rotated by the combustion gas flowing through the combustion gas flow path. As a result, the rotor of the generator 50 rotates as well and the electric power generation by the generator 50 is performed.

Figure 5:
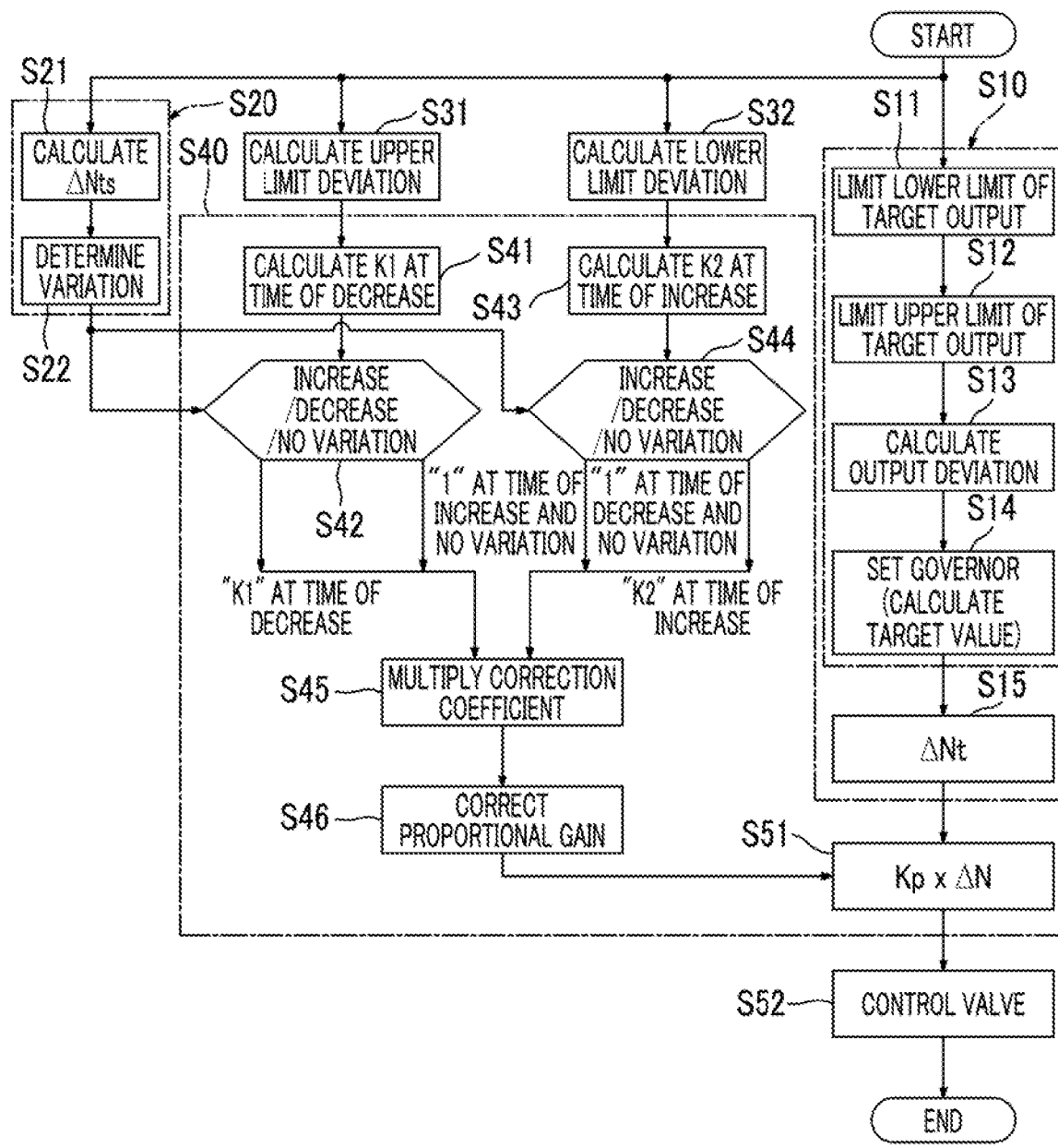
FIG. 5 is a flowchart illustrating an operation of the control device according to the embodiment of the present invention.

Hereinafter, an operation of the control device during an operation process of the gas turbine 10 will be described with reference to a flowchart illustrated in FIG. 5.

The target value output unit 110 of the control device 100 outputs the target rotation speed Nt (target value) of the gas turbine 10 (S10: target value output step). In this target value output step (S10), the lower limit limiter 111 first outputs the larger one of the target output Pt of the gas turbine 10 received by the target output receiving unit 101 and the set lower limit output Pd received by the lower limit output receiving unit 103 as the target output Pt (S11: target output lower limit limiting step). Then, the upper limit limiter 112 outputs the smaller one of the target output Pt output from the lower limit limiter 111 and the set upper limit output Pu received by the upper limit output receiving unit 102 as the target output Pt (S12: target output upper limit limiting step). Then, the output deviation calculator 113 obtains the output deviation $\Delta P$, which is the deviation of the target output Pt output from the upper limit limiter 112 with respect to the actual output Pr detected by the output meter 61 (S13: output deviation calculation step). Then, the governor setter (target value calculator) 114 determines the target rotation speed Nt (target value) based on the output deviation $\Delta P$ (S14: governor setting step (target value calculation step)). At this time, the governor setter 114 obtains the target rotation speed Nt in accordance with the output deviation $\Delta P$ by using the arbitration rate showing the rotation speed-output relationship or the like. Then, the target value output step (S10) is terminated.

The target value deviation calculation unit 115 of the control device 100 obtains the target rotation speed deviation $\Delta Nt$ (target value deviation), which is the deviation of the target rotation speed ht with respect to the actual rotation speed Nr detected by the rotation speed meter 62 (S15: target value deviation calculation step).

The rotation speed variation detecting unit 120 of the control device 100 detects the variation of the actual rotation speed Nr (S20: rotation speed variation detection step). In this rotation speed variation detection step (S20), the rotation speed variation amount calculator 122 first obtains the deviation $\Delta Nts$ of the actual rotation speed Nr from the rotation speed meter 62 with respect to the actual rotation speed Nr from the delayer 121 (S21: rotation speed variation amount calculation). Then, the variation determination unit 123 outputs any one of the rotation speed increase (+), the rotation speed decrease (−), and the no variation (0) in accordance with the deviation $\Delta Nts$ obtained by the rotation speed variation amount calculator 122 (S22: variation determination step). The variation determination unit 123 outputs the rotation speed increase (+) in a case where the deviation $\Delta Nts$ exceeds the previously determined positive value. The variation determination unit 123 outputs the rotation speed decrease (−) in a case where the previously determined negative value exceeds the deviation $\Delta Nts$. The variation determination unit 123 outputs the no variation (0) in a case where the deviation $\Delta Nts$ is within the range from the previously determined negative value to the previously determined positive value.

The upper limit deviation calculation unit 131 of the control device 100 obtains the upper limit deviation $\Delta Pu$, which is the deviation of the set upper limit output Pu with respect to the actual output Pt detected by the output meter 61 (S31: upper limit deviation calculation step). In addition, the lower limit deviation calculation unit 132 of the control device 100 obtains the lower limit deviation $\Delta Pd$, which is the deviation of the actual output Pr detected by the output meter 61 with respect to the set lower limit output Pd (S32: lower limit deviation calculation step).

The parameter-changing unit 140 of the control device 100 changes the target rotation speed deviation $\Delta Nt$ (target value deviation) (S40: parameter-changing step). In this parameter-changing step (S40), the first correction coefficient generator 141 obtains the first correction coefficient k1 in accordance with the upper limit deviation $\Delta Pu$ by using the first function F (S41). The first selector 144 outputs the first correction coefficient k1 from the first correction coefficient generator 141 after receiving the rotation speed decrease (−) from the variation determination unit 123 and outputs the fixed coefficient "1" from the fixed coefficient generator 143 as the first correction coefficient k1 after receiving the rotation speed increase (+) or the no variation (0) from the variation determination unit 123 (S42).

In addition, in the parameter-changing step (S40), the second correction coefficient generator 142 obtains the second correction coefficient k2 in accordance with the lower limit deviation $\Delta Pd$ by using the second function G (S43). The second selector 145 outputs the second correction coefficient k2 from the second correction coefficient generator 142 after receiving the rotation speed increase (+) from the variation determination unit 123 and outputs the fixed coefficient from the fixed coefficient generator 143 as the second correction coefficient k2 after receiving the rotation speed decrease (−) or the no variation (0) from the variation determination unit 123 (S44).

Furthermore, in the parameter-changing step (S40), the first multiplier 145 multiplies the first correction coefficient k1 and the second correction coefficient k2 and obtains the correction coefficient (S45: correction coefficient calculation step). Then, the second multiplier 141 multiplies the proportional gain Kp from the proportional gain generator 151 and the correction coefficient from the first multiplier 146 and corrects the proportional gain Kp (S46: proportional gain correction step). The gain multiplier 152 multiplies the target rotation speed deviation $\Delta Nt$ (target value deviation) by the corrected proportional gain Kp and determines the flow rate (fuel equivalent value) of the fuel supplied to the gas turbine 10 (S51: fuel equivalent value setting step). Then, the parameter-changing step (S40) is terminated.

The flow rate (fuel equivalent value) of the fuel supplied to the gas turbine 10 is determined in the final step (S51) of the parameter-changing step (S40). Accordingly, the final step (S51) of the parameter-changing step (S40) is a fuel equivalent, value calculation step.

Changes in the proportional gain Kp in various states will be described in an organized manner below.

In a case where the actual rotation speed Nr is on the decrease, the first selector 144 outputs the first correction coefficient k1 from the first correction coefficient generator 141 as illustrated in FIG. 1. In the case of the small upper limit deviation $\Delta Pu1$ (refer to FIG. 3), that is, in a case where the actual output Pr is close to the set upper limit output Pu, a value that is less than is output as the first correction coefficient k1 output from the first correction coefficient generator 141. Accordingly, in a case where the actual rotation speed Nr is on the decrease and the actual output Pr is close to the set upper limit output Pu, the first selector 144 outputs a value that is less than "1" as the first correction coefficient k1.

In a case where the actual rotation speed Nr is on the decrease, the second selector 145 outputs the fixed coefficient "1" from the fixed coefficient generator 143 as the second correction coefficient k2 regardless of relationship between the actual output Pr and the set upper limit output Pu and relationship between the actual output Pr and the set lower limit output Pd.

Accordingly, in a ease where the actual rotation speed Nr is on the decrease and the actual output Pr is close to the set upper limit output Pu, the first multiplier 146 multiplies the first correction coefficient k1 that is a value which is less than "1" and the second correction, coefficient k2 that is "1" and regards this multiplied value as the correction coefficient. Since this correction coefficient is a value that is less than "1", the proportional gain Kp output from the proportional gain generator 151 exceeds the proportional gain Kp corrected by the second multiplier 147. Accordingly, the target rotation speed deviation ΔNt (fuel equivalent value) multiplied by the uncorrected proportional gain Kp exceeds the target rotation speed deviation ΔNt (fuel equivalent value) multiplied by the corrected proportional gain Kp.

In a case where the actual rotation speed Nr is on the increase, the second selector 145 outputs the second correction coefficient k2 from the second correction coefficient generator 142 as illustrated in FIG. 2. In the case of the small lower limit deviation ΔPd1 (refer to FIG. 4), that is, in a case where the actual output Pr is close to the set lower limit output Pd, a value that exceeds "1" is output as the second correction coefficient k2 output from the second correction coefficient generator 142. Accordingly, in a case where the actual rotation speed Nr is on the increase and the actual output Pr is close to the set lower limit output Pd, the second selector 145 outputs a value that exceeds "1" as the second correction coefficient K2.

In a case where the actual rotation speed Hr is on the increase, the first selector 144 outputs the fixed coefficient "1" from the fixed coefficient generator 143 as the first correction coefficient k1 regardless of relationship between the actual output Pr and the set lower limit output Pd and relationship between the actual output Pr and the set upper limit output Pu.

Accordingly, in a case where the actual rotation speed Nr is on the increase and the actual output Pr is close to the set lower limit output Pd, the first multiplier 146 multiplies the first correction coefficient k1 that is "1" and the second correction coefficient k2 that is a value which exceeds "1" and regards this multiplied value as the correction coefficient. Since this correction coefficient is a value that exceeds "1", the proportional gain Kp corrected by the second multiplier 147 exceeds the proportional gain Kp output from the proportional gain generator 151. Accordingly, the target rotation speed deviation ΔNt (fuel equivalent value) multiplied by the corrected proportional gain Kp exceeds the target rotation speed deviation ΔNt (fuel equivalent value) multiplied by the uncorrected proportional gain Kp.

Even in a case where the actual rotation speed Nr is on the decrease, the first correction coefficient k1 output from the first correction coefficient generator 141 is "1" in the case of the large upper limit deviation ΔPu2 (refer to FIG. 3), that is, in a case where the actual output Pr is not close to the set upper limit output Pu. In this case, the first selector 144 outputs "1" from the first correction coefficient generator 141 as the first correction coefficient k1. As described above, the second selector 145 uniformly outputs "1" as the second correction coefficient k2 in a case where the actual output Pr is on the decrease. Accordingly, in a case where the actual rotation speed Nr is on the decrease and the actual output Pr is not close to the set upper limit output Pu, the correction coefficient obtained by the first multiplier 146 is "1" and the value of the proportional gain Kp corrected by the second multiplier 147 remains equal to the value of the proportional pain Kp output from the proportional gain generator 151. Accordingly, in this case, the value of the target rotation speed deviation ΔNt (fuel equivalent value) multiplied by the corrected proportional gain Kp is equal to the value of the target rotation speed deviation ΔNt (fuel equivalent value) multiplied by the uncorrected proportional gain Kp.

Even in a case where the actual rotation speed Nr is on the increase, the second correction coefficient k2 output from the second correction coefficient generator 142 is "1" in the case of the large lower limit deviation ΔPd2 (refer to FIG. 4), that is, in a case where the actual output Pr is not close to the set lower limit output Pd. In this case, the second selector 145 outputs from the second correction coefficient generator 142 as the second correction coefficient k2. As described above, the first selector 144 uniformly outputs as the first correction coefficient k1 in a case where the actual output Pr is on the increase. Accordingly, in a case where the actual rotation speed Nr is on the increase and the actual output Pr is not close to the set lower limit output Pd, the correction coefficient obtained by the first multiplier 146 is "1" and the value of the proportional gain Kp corrected by the second multiplier 147 remains equal to the value of the proportional gain Kp output from the proportional gain generator 151. Accordingly, in this case, the value of the target rotation speed deviation ΔNt (fuel equivalent value) multiplied by the corrected proportional gain Kp is equal to the value of the target rotation speed deviation ΔNt (fuel equivalent value) multiplied by the uncorrected proportional gain Kp.

In a case where the actual rotation speed Nr undergoes no substantial variation, the first selector 144 outputs the fixed coefficient "1" from the fixed coefficient generator 143 as the first correction coefficient k1 and the second selector 145 outputs the fixed coefficient "1" from the fixed coefficient generator 143 as the second correction coefficient k2. Accordingly, in this case, the correction coefficient obtained by the first multiplier 146 is "1" and the value of the proportional gain Kp corrected by the second multiplier 147 remains equal to the value of the proportional gain Kp output from the proportional gain generator 151. Accordingly, in this case, the value of the target rotation speed deviation ΔNt (fuel equivalent value) multiplied by the corrected proportional gain Kp is equal to the value: of the target rotation speed deviation ΔNt (fuel equivalent value) multiplied by the uncorrected proportional gain Kp.

As described above, in this embodiment, the proportional gain Kp output from the proportional gain generator 151 is corrected and decreased in a case where the actual rotation speed Nr is on the decrease and the actual output Pr is close to the set upper limit output Pu. Accordingly, the target rotation speed deviation ΔNt (fuel equivalent value) multiplied by the uncorrected proportional gain Kp exceeds the target rotation speed deviation ΔNt (fuel equivalent value) multiplied by the corrected proportional gain Kp. In a case where the actual rotation speed Nr is on the increase and the actual output Pr is close to the set lower limit output Pd, the proportional gain Kp output from the proportional gain generator 151 is corrected and increased. Accordingly, the target rotation speed deviation ΔNt (fuel equivalent value) multiplied by the corrected proportional gain Kp exceeds the target rotation speed deviation ΔNt (fuel equivalent value)

multiplied by the uncorrected proportional gain Kp. In a case other than the cases described above, the correction coefficient is "1", and thus the value of the proportional gain Kp output from the proportional gain generator 151 remains unchanged despite correction. Accordingly, in this case, the value of the target rotation speed deviation ΔNt (fuel equivalent value) multiplied by the corrected proportional gain Kp is equal to the value of the target rotation speed deviation ΔNt (fuel equivalent value) multiplied by the uncorrected proportional gain Kp.

After the flow rate (fuel equivalent value) of the fuel supplied to the gas turbine 10 is determined by the gain multiplier 152 (S51), the valve control unit 155 creates the valve opening degree command that shows a valve opening degree in accordance with the flow rate (fuel equivalent value) of the fuel and outputs the valve opening degree command to the fuel regulation valve 36 (S52). The fuel regulation valve 36 reaches the valve opening degree shown by the valve opening degree command and the nozzle 31 of the combustor 30 is supplied with the fuel at the flow rate determined in the fuel equivalent value setting step (S51).

In this embodiment, the fuel flow rate (fuel equivalent value) is determined in accordance with the target rotation speed deviation ΔNt, which is the deviation between the target rotation speed Nt and the actual rotation speed Nr, as described above. Accordingly, the rotation speed of the gas turbine 10 can be stabilized.

A decrease in the actual rotation speed Nr in a case where the actual output Pr at the present point in time is close to the set upper limit output Pu of the gas turbine 10 results in an increase in the target rotation speed deviation ΔNt as the deviation between the target rotation speed Nt and the actual rotation speed Nr. This might cause the fuel flow rate to increase and the actual output Pr to exceed the set upper limit output Pu. An increase in the actual rotation speed Nr in a case where the actual output Pr at the present point in time is close to the set lower limit output Pd of the gas turbine 10 results in a decrease in the target rotation speed deviation ΔNt as the deviation between the target rotation speed Mt and the actual rotation speed Nr. This might cause the fuel flow rate to decrease and the set lower limit output Pd to exceed the actual output Pr.

In this embodiment, however, the proportional gain Kp is corrected and decreased as described above in a case where the actual rotation speed Nr has decreased when the actual output Pr of the gas turbine 10 is close to the set upper limit output Pu. Accordingly, an increase in the target rotation speed deviation ΔNt can be suppressed, by the target rotation speed deviation ΔNt being multiplied by the corrected proportional gain Kp, even in the case of an increase in the target rotation speed deviation ΔNt resulting from a decrease in the actual rotation speed Nr. Accordingly, in this embodiment, the possibility of the actual output Pr exceeding the set upper limit output Pu can be reduced even in a case where the actual rotation speed Nr has decreased when the actual output Pr of the gas turbine 10 is close to the set upper limit output Pu. In addition, in this embodiment, the proportional gain Kp is corrected and increased as described above in a case where the actual rotation speed Nr has increased when the actual output Pr of the gas turbine 10 is close to the set lower limit output Pd. Accordingly, a decrease in the target rotation speed deviation ΔNt can be suppressed, by the target rotation speed deviation ΔNt being multiplied by the corrected proportional gain Kp, even in the case of a decrease in the target rotation speed deviation ΔNt resulting from an increase in the actual rotation speed Nr. Accordingly, in this embodiment, the possibility of the set lower limit output Pd exceeding the actual output Pr can be reduced even in a case where the actual rotation speed Nr has increased when the actual output Pr of the gas turbine 10 is close to the set lower limit output Pd.

Accordingly, with this embodiment, a deviation of the actual output Pr from a set output range can be suppressed and the rotation speed of the gas turbine 10 can be stabilized at the same time.

In this embodiment, the target rotation speed deviation ΔNt is multiplied by the corrected proportional gain Kp after the proportional gain Kp is corrected by the use of the correction coefficient. However, the corrected target rotation speed deviation ΔNt may be multiplied by the uncorrected proportional gain Kp after the target rotation speed deviation ΔNt is corrected by the use of the correction coefficient.

First Modification Example

Figure 6:
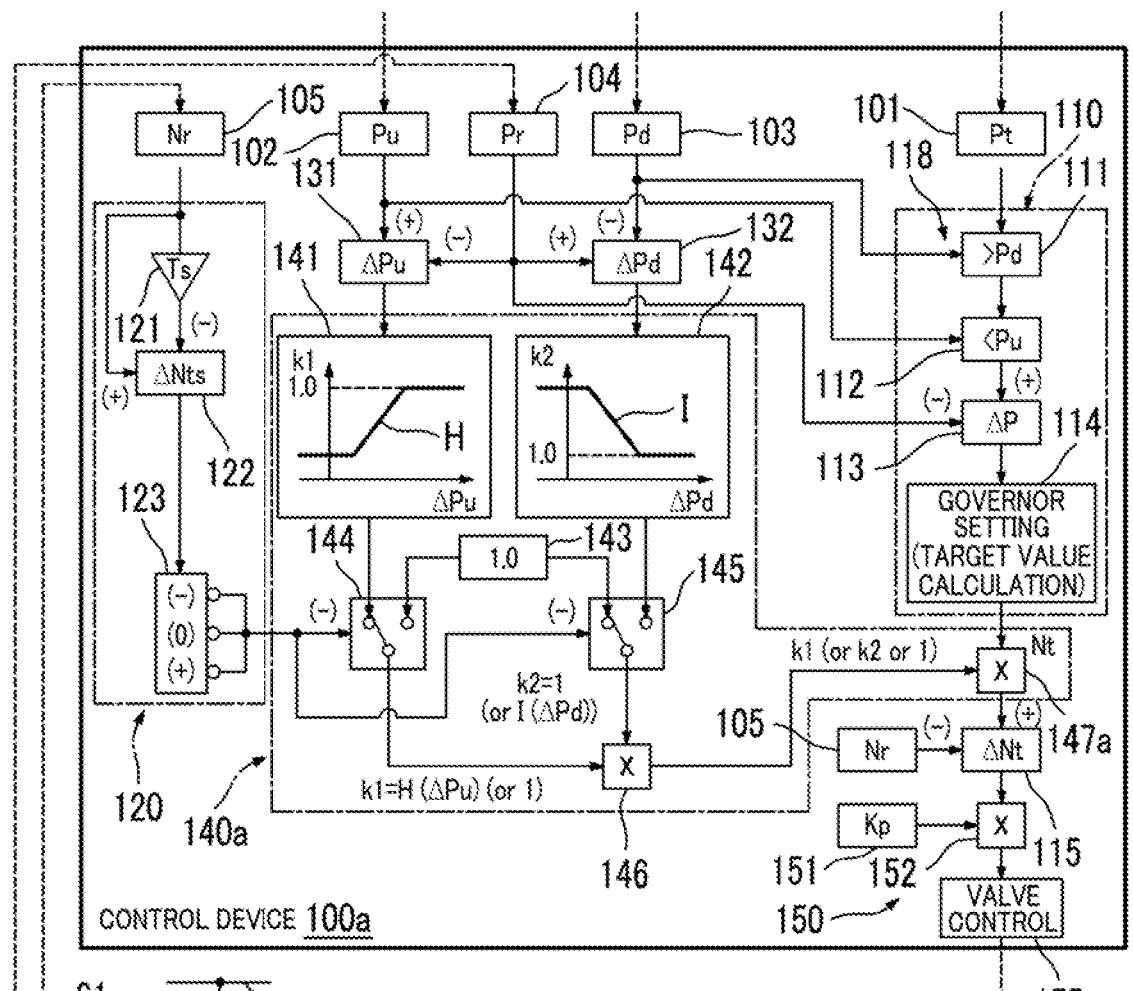
FIG. 6 is an explanatory diagram illustrating a configuration of a gas turbine and a functional configuration of a control device according to a first modification example of the embodiment of the present invention.
Figure 6:
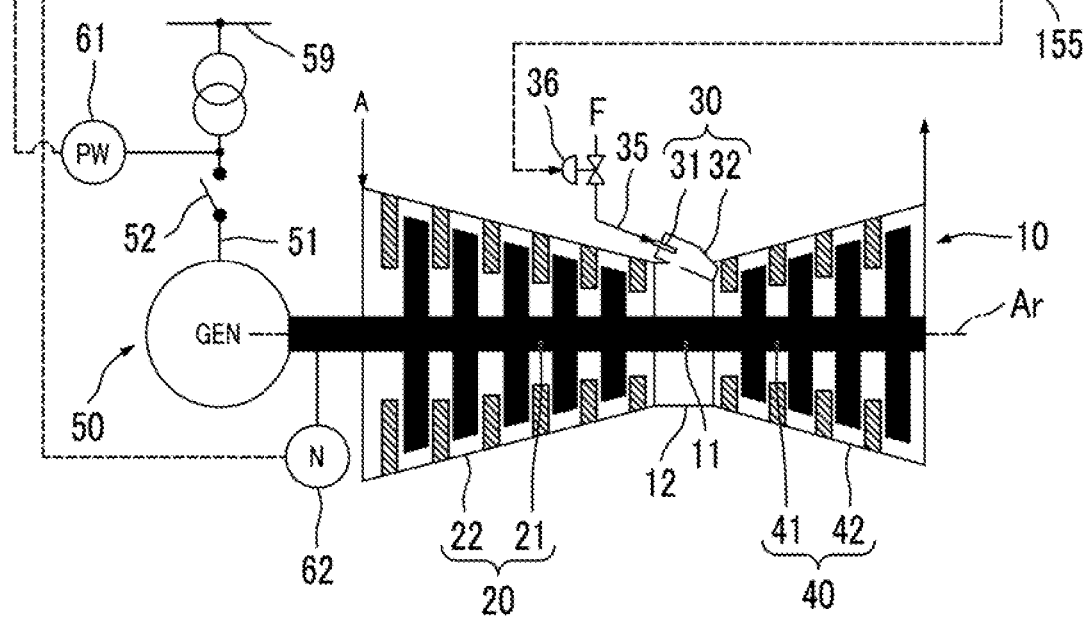

A first modification example of the gas turbine installation according to the present invention will be described with reference to FIG. 6.

In the embodiment described above, the target rotation speed deviation ΔNt is changed by the parameter-changing unit 140 of the control device 100. In this modification example, a parameter-changing unit 140a of a control device 100a changes the target rotation speed Nt (target value).

Similarly to the control device 100 according to the embodiment described above, the control device 100a according to this modification example has the target output receiving unit 101, the upper limit output receiving unit 102, the lower limit output receiving unit 103, the actual output receiving unit 104, the actual rotation speed receiving unit 105, the target value output unit 110, the target value deviation calculation unit 115, the rotation speed variation detecting unit 120, the upper limit deviation calculation unit 131, the lower limit deviation calculation unit 132, the parameter-changing unit 140a, the fuel equivalent value calculation unit 150, and the valve control unit 155. This modification example differs from the embodiment with regard to the parameter-changing unit 140a as described above.

The parameter-changing unit 140a according to this modification example has the first correction coefficient generator 141 that obtains the first correction coefficient k1 of the target rotation speed Nt in accordance with the upper limit deviation ΔPu by using a first function H, the second correction coefficient generator 142 that obtains the second correction coefficient k2 of the target rotation speed Nt in accordance with the lower limit deviation ΔPd by using a second function I, and the fixed coefficient generator 143 that generates the fixed coefficient (=1) as the first correction coefficient k1 and the second correction coefficient k2. In addition, the parameter-changing unit 140a according to this modification example has the first selector 144 that outputs either the first correction coefficient k1 from the first correction coefficient generator 141 or the fixed coefficient from the fixed coefficient generator 143 as the first correction coefficient k1, the second selector 145 that outputs either the second correction coefficient k2 from the second correction coefficient generator 142 or the fixed coefficient from the fixed coefficient generator 143 as the second correction coefficient k2, the first multiplier 146 that multiplies the first correction coefficient k1 output from the first selector 144 and the second correction coefficient k2 output from the second selector 145, and a second multiplier 147a that multiplies the target rotation speed Nt (target value) from the governor setter 114 and the correction coefficient from the first multiplier 146.

The first correction coefficient generator 141 obtains the first correction coefficient k1 with respect to the upper limit deviation ΔPu obtained by the upper limit deviation calculation unit 131 by using the first function H, which shows the relationship between the upper limit deviation ΔPu and the first correction coefficient k1. Similarly to the first function F according to the embodiment described above, the first function H is a function that outputs a value which is less than "1.0" as the first correction coefficient k1 in the case of a small upper limit deviation ΔPu and outputs "1.0" as the first correction coefficient k1 in the case of a large upper limit deviation ΔPu. The second correction coefficient generator 142 obtains the second correction coefficient k2 with respect to the lower limit deviation ΔPd obtained by the lower limit deviation calculation unit 132 by using the second function I, which shows the relationship between the lower limit deviation ΔPd and the second correction coefficient k2. Similarly to the second function G according to the embodiment described above, the second function I is a function that outputs a value which exceeds "1" as the value of the second correction coefficient k2 in the case of a small lower limit deviation ΔPd and outputs "1.0" as the value of the second correction coefficient k2 in the case of a large lower limit deviation ΔPd.

The first selector 144 and the second selector 145 are operated in the same manner as in the embodiment described above.

The gain multiplier 152 according to this modification example obtains the fuel flow rate (fuel equivalent value) by multiplying the target rotation speed deviation ΔNt, which is the deviation of the actual rotation speed Nr with respect to the target rotation speed: Nt corrected by the second multiplier 147a, by the proportional, gain Kp from the proportional, gain generator 151.

Accordingly, in this modification example, the target rotation speed Nt from the governor setter 114 decreases because of the correction by the second multiplier 147a in a case where the actual rotation speed Nr has decreased when the actual output Pr of the gas turbine 10 is close to the set upper limit output Pu, Accordingly, the deviation ΔNt of the uncorrected target rotation speed Nt with respect to the actual rotation speed Nr exceeds the deviation ΔNt of the corrected target rotation speed Nt with respect to the actual rotation speed Nr. Accordingly, in this modification example, the possibility of the actual output Pr exceeding the set upper limit output Pu can be reduced, as in the first embodiment, even in a case where the actual rotation speed Nr has decreased when the actual output Pr of the gas turbine 10 is close to the set upper limit output Pu. In addition, in this modification example, the target rotation speed Nt from the governor setter 114 increases because of the correction by the second multiplier 147a in a case where the actual rotation speed Nr has increased when the actual, output Pr is close to the set lower limit output Pd. Accordingly, the deviation ΔNt of the corrected target rotation speed Nt with respect to the actual rotation speed Nr exceeds the deviation ΔNt of the uncorrected target rotation speed Nt with respect to the actual rotation speed Nr. Accordingly, in this modification example, the possibility of the set lower limit output Pd exceeding the actual output Pr can be reduced, as in the first embodiment, even in a case where the actual rotation speed Nr has increased when the actual output Pr of the gas turbine 10 is close to the set lower limit output Pd.

Second Modification Example

Figure 7:
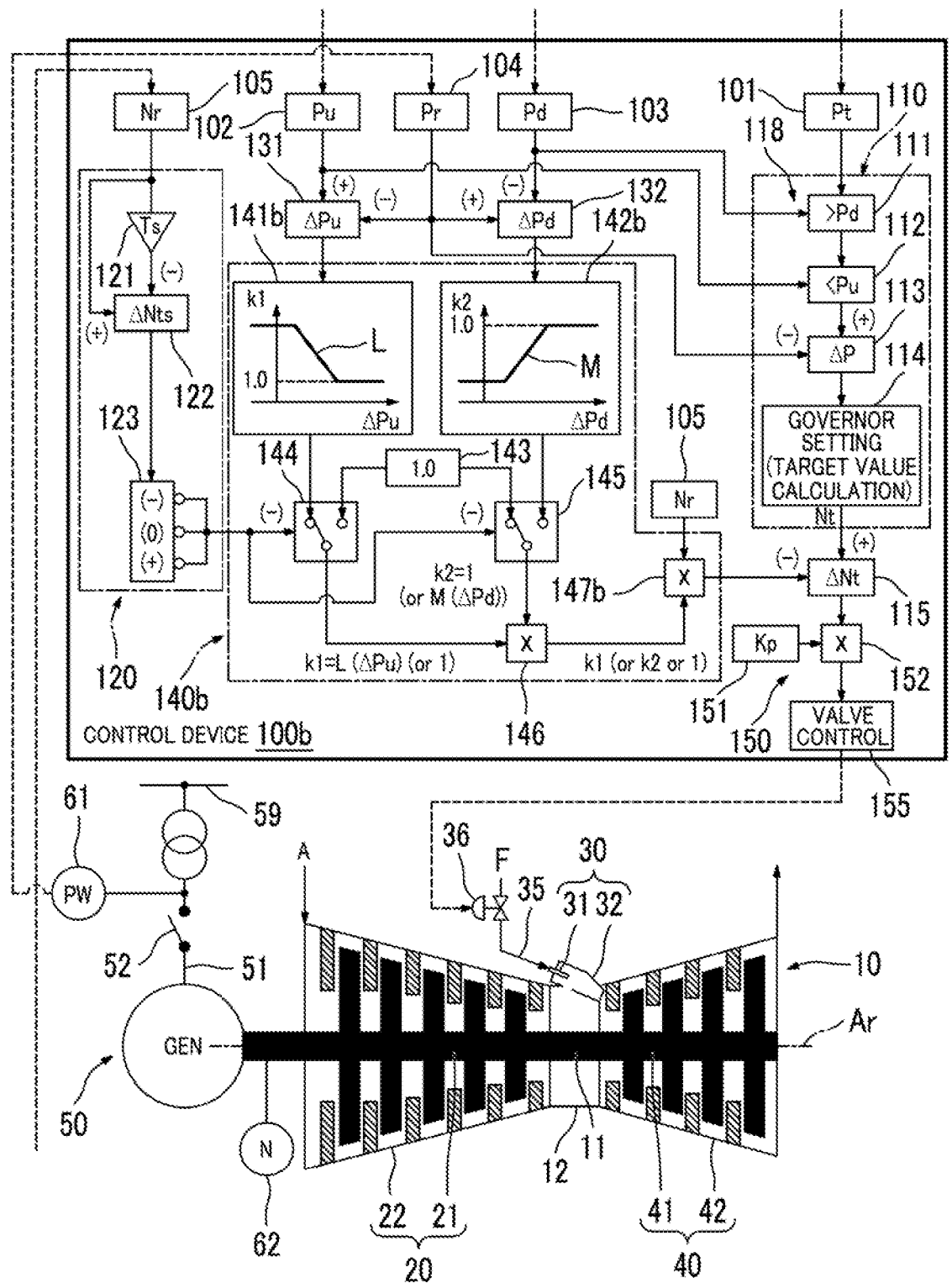
FIG. 7 is an explanatory diagram illustrating a configuration of a gas turbine and a functional configuration of a control device according to a second modification example of the embodiment of the present invention.

A second modification example of the gas turbine installation according to the present invention will be described with reference to FIG. 7.

In the embodiment described above, the target rotation speed deviation ΔNt is changed by the parameter-changing unit 140 of the control device 100 as described above. In this modification example, a parameter-changing unit 140b of a control device 100b changes the actual rotation speed Nr.

Similarly to the control device 100 according to the embodiment described above, the control device 100b according to this modification example has the target output receiving unit 101, the upper limit output receiving unit 102, the lower limit output receiving unit 103, the actual output receiving unit 104, the actual rotation speed receiving unit 105, the target value output unit 110, the target value deviation calculation unit 115, the rotation speed variation detecting unit 120, the upper limit deviation calculation unit 131, the lower limit deviation calculation unit 132, the parameter-changing unit 140b, the fuel equivalent value calculation unit 150, and the valve control unit 155. This modification example differs from the embodiment with regard to the parameter-changing unit 140b as described above.

The parameter-changing unit 140b according to this modification example has a first correction coefficient generator 141b that obtains the first correction coefficient k1 of the target rotation speed Nt in accordance with the upper limit deviation ΔPu by using a first function L, a second correction coefficient generator 142b that obtains the second correction coefficient k2 of the target rotation speed Nt in accordance with the lower limit deviation ΔPd by using a second function M, and the fixed coefficient generator 143 that generates the fixed coefficient (=1) as the first correction coefficient k1 and the second correction coefficient k2. In addition, the parameter-changing unit 140b according to this modification example has the first selector 144 that outputs either the first correction coefficient k1 from the first correction coefficient generator 141b on the fixed coefficient from the fixed coefficient generator 143 as the first correction coefficient k1, the second selector 145 that outputs either the second correction coefficient k2 from the second correction coefficient generator 142b or the fixed coefficient from the fixed coefficient generator 143 as the second correction coefficient k2, the first multiplier 146 that multiplies the first correction coefficient k1 output from the first selector 144 and the second correction coefficient k2 output from the second selector 145, and a second multiplier 147b that multiplies the actual rotation speed Nr received by the actual rotation speed receiving unit 105 and the correction coefficient from the first multiplier 146.

The first correction coefficient generator 141b obtains the first correction coefficient k1 with respect to the upper limit deviation ΔPu obtained by the upper limit deviation calculation unit 131 by using the first function L, which shows the relationship between the upper limit deviation ΔPu and the first correction coefficient k1. Unlike the first functions F and H according to the embodiment and the first modification example described above, the first function L is a function that outputs a value which exceeds "1.0" as the first correction coefficient k1 in the case of a small upper limit deviation ΔPu and outputs "1.0" as the first correction, coefficient k1 in the case of a large upper limit deviation ΔPu. The second correction coefficient generator 142b obtains the second correction coefficient k2 with respect to the lower limit deviation ΔPd obtained by the lower limit deviation calculation unit 132 by using the second function M, which shows the relationship between the lower limit deviation ΔPd and the second correction coefficient k2. Unlike the second functions G and I according to the embodiment and the first modification example described above, the second function M is a function that outputs a value which is less than "1.0" as the value of the second correction coefficient k2 in the case of a small lower limit deviation ΔPd and outputs "1.0" as the value of the second correction coefficient k2 in the case of a large lower limit deviation ΔPd.

The first selector 144 and the second selector 145 are operated in the same manner as in the embodiment described above.

The target value deviation calculation unit 115 according to this modification example obtains the target rotation speed deviation ΔNt (target value deviation), which is the deviation of the target rotation speed Nt with respect to the actual rotation speed Nr corrected by the second multiplier 147b (S15: target value deviation calculation step). The gain multiplier 152 obtains the fuel flow rate (fuel equivalent value) by multiplying the target rotation speed deviation ΔNt (target value deviation), which is the deviation between the actual rotation speed Nr corrected by the second multiplier 147b and the target rotation speed Nt, by the proportional gain Kp from the proportional gain generator 151.

Accordingly, in this modification example, the actual rotation speed Nr from the actual rotation speed receiving unit 105 decreases because of the correction by the second multiplier 147b in a case where the actual rotation speed Nr has decreased when the actual output Pr of the gas turbine 10 is close to the set upper limit output Pu. Accordingly, the deviation of the target rotation speed Nt with respect to the uncorrected actual rotation speed Nr exceeds the deviation of the target rotation speed Nt with respect to the corrected actual rotation speed Nr. Accordingly, in this modification example, the possibility of the actual output Pr exceeding the set upper limit output Pu can be reduced, as in the embodiment the second modification example described above, even in a case where the actual rotation speed Nr has decreased when the actual output Pr of the gas turbine 10 is close to the set upper limit output Pu. In addition, in this modification example, the actual rotation speed Nr from the actual rotation speed receiving unit 105 increases because of the correction by the second multiplier 147b in a case where the actual rotation speed Nr has increased when the actual output Pr of the gas turbine 10 is close to the set lower limit output Pd. Accordingly, the deviation of the target rotation speed Nt with respect to the corrected actual rotation speed Nr exceeds the deviation of the target rotation speed Nt with respect to the uncorrected actual rotation speed Nr. Accordingly, in this modification example, the possibility of the set lower limit output Pd exceeding the actual output Pr can be reduced, as in the embodiment and the first modification example described above, even in a case where the actual rotation speed Nr has increased when the actual output Pr of the gas turbine 10 is close to the set lower limit output Pd.

Other Modification Examples

Although the actual rotation speed Nr is used as the actual rotation speed equivalent value and the target rotation speed Nt is used as the target value in the embodiment and each of the modification examples described above, (actual rotation speed Nr/rated rotation speed) may be used as the actual rotation speed equivalent value and (target rotation speed Nt/rated rotation speed) may be used as the target value instead. An actual frequency of the electric power that is generated by the generator 50 or (actual frequency/rated frequency) may be used as the actual rotation, speed equivalent value and a target frequency or (target frequency/rated frequency) may be used as the target value as well.

In the embodiment and each of the modification examples described above, the target rotation speed Nt is determined as the target value by the target value calculator (governor setter) 114. However, an output target value may be determined instead. In this case, the actual rotation speed Nr from the actual rotation speed receiving unit 105 may be converted to an output by the use of an arbitration rate or the like and a deviation between the output target value and the output converted from the actual rotation speed Nr with the arbitration rate or the like may be obtained as the target value deviation by the target value deviation calculation unit 115. In other words, the target value may be the output, and the actual rotation speed equivalent value is the output and the target value deviation is the deviation of the output in this case.

INDUSTRIAL APPLICABILITY

According to an aspect of the present invention, the deviation of the actual output from the set output range can be suppressed and the rotation speed of the gas turbine can be stabilized at the same time.

REFERENCE SIGNS LIST

10: Gas turbine
20: Compressor
30: Combustor
35: Fuel supply line
36: Fuel regulation valve
40: Turbine
50: Generator
61: Output meter
62: Rotation speed meter
100, 100a, 100b: Control device
101: Target output receiving unit
102: Upper limit output receiving unit
103: Lower limit output receiving unit
104: Actual output receiving unit
105: Actual rotation speed receiving unit
110: Target value output unit
111: Lower limit limiter
112: Upper limit limiter
113: Output deviation calculator
114: Governor setter (target value calculator)
115: Target value deviation calculation unit
118: Target output limiting unit
120: Rotation speed variation detecting unit
131: Upper limit deviation calculation unit
132: Lower limit deviation calculation unit
140, 140a, 140b: Parameter-changing unit
141, 141a, 142b: First correction coefficient generator
142, 142a, 142b: Second correction coefficient generator
143: Fixed coefficient generator
144: First selector
145: Second selector
146: First multiplier
147, 147a, 147b: Second multiplier
150: Fuel equivalent value calculation unit 151: Proportional gain generator
152: Gain multiplier
155: Valve control unit

The invention claimed is:

1. A control device for a gas turbine comprising: the control device configured to:
   output a target value that is equivalent to a target rotation speed of the gas turbine;
   obtain a target value deviation, the target value deviation being a deviation of the target value with respect to an actual rotation speed equivalent value that is equivalent to an actual rotation speed of the gas turbine;
   detect a variation of the actual rotation speed of the gas turbine, wherein the variation is between a first actual rotation speed and a second actual rotation speed after a delay of a predetermined period of time, and output an indication of whether the actual rotation speed equivalent value has increased or decreased in accordance with the variation:
   obtain an upper limit deviation, the upper limit deviation being a deviation of a set upper limit output of the gas turbine with respect to an actual output of the gas turbine;
   obtain a lower limit deviation, the lower limit deviation being a deviation of the actual output of the gas turbine with respect to a set lower limit output of the gas turbine; and-
   change any one of the target value, the actual rotation speed equivalent value, and the target value deviation such that
   the target value deviation decreases in a case where the actual rotation speed equivalent value has decreased when the upper limit deviation is smaller than a first previously determined value, and
   the target value deviation increases in a case where the actual rotation speed equivalent value has increased when the lower limit deviation is smaller than a second previously determined value;
   and determine a fuel equivalent value that is equivalent to a flow rate of fuel supplied to the gas turbine in accordance with the target value deviation such that
   the fuel equivalent value decreases and the actual output of the gas turbine remains below the set upper limit output in a case where the target value deviation decreases,
   and the fuel equivalent value increases and the actual output of the gas turbine remains above the set lower limit output in a case where the target value deviation increases.

2. The control device for the gas turbine according to claim 1, wherein changing said any one of the target value, the actual rotation speed equivalent value, and the target value deviation includes:
   correcting a proportional gain by decreasing the proportional gain in the case where the actual rotation speed equivalent value has decreased when the upper limit deviation is smaller than the first previously determined value, and increasing the proportional gain in the case where the actual rotation speed equivalent value has increased when the lower limit deviation is smaller than the second previously determined value;
   multiplying the target value deviation by the corrected proportional gain to obtain a corrected target value deviation; and
   outputting the corrected target value deviation as the fuel equivalent value.

3. The control device for the gas turbine according to claim 1, wherein outputting the target value includes:
   limiting a target output of the gas turbine by outputting, as a limited target output, a smaller one of
   (a) a larger one of (i) a previously received target output of the gas turbine and (ii) the set lower limit output and
   (b) the set upper limit output,
   obtaining an output deviation, the output deviation being a deviation of the limited target output with respect to the actual output of the gas turbine, and
   obtaining the target value that is equivalent to the target rotation speed of the gas turbine based on the output deviation.

4. The control device for the gas turbine according to claim 3, wherein obtaining the target value includes:
   obtaining the target value in accordance with the output deviation by using an arbitration rate showing a rotation speed-output relationship.

5. The control device for the gas turbine according to claim 1, wherein the control device is further configured to:
   create a valve opening degree command in accordance with the decreased fuel equivalent value that is determined in accordance with the decreased target value deviation, or in accordance with the increased fuel equivalent value that is determined in accordance with the increased target value deviation;
   and output the valve opening degree command to a fuel regulation valve that regulates the flow rate of the fuel supplied to the gas turbine to stabilize the actual rotation speed of the gas turbine.

6. A gas turbine installation comprising:
   the control device for the gas turbine according to claim 5;
   the fuel regulation valve; and
   the gas turbine.

7. The control device for the gas turbine according to claim 1, wherein changing said any one of the target value, the actual rotation speed equivalent value, and the target value deviation includes:
   correcting the target value such that the target value decreases in the case where the actual rotation speed equivalent value has decreased when the upper limit deviation is smaller than the first previously determined value, and the target value increases in the case where the actual rotation speed equivalent value has increased when the lower limit deviation is smaller than the second previously determined value;
   multiplying the target value deviation by a proportional gain to obtain a corrected target value deviation, the target value deviation being a deviation of the corrected target value with respect to the actual rotation speed equivalent value; and
   outputting the corrected target value deviation as the fuel equivalent value.

8. The control device for the gas turbine according to claim 1, wherein changing said any one of the target value, the actual rotation speed equivalent value, and the target value deviation includes:
   correcting the actual rotation speed equivalent value such that the actual rotation speed equivalent value decreases in the case where the actual rotation speed equivalent value has decreased when the upper limit deviation is smaller than the first previously determined value, and the actual rotation speed equivalent value increases in the case where the actual rotation speed equivalent value has increased when the lower limit deviation is smaller than the second previously determined value;

multiplying the target value deviation by a proportional gain to obtain a corrected target value deviation, the target value deviation being a deviation of the target value with respect to the corrected actual rotation speed equivalent value; and outputting the corrected target value deviation as the fuel equivalent value.

9. A fuel control method for a gas turbine comprising:

outputting a target value that is equivalent to a target rotation speed of the gas turbine; obtaining a target value deviation, the target value deviation being a deviation of the target value with respect to an actual rotation speed equivalent value that is equivalent to an actual rotation speed of the gas turbine;

detecting a variation of the actual rotation speed of the gas turbine, wherein the variation is between a first actual rotation speed and a second actual rotation speed after a delay of a predetermined period of time, and outputting an indication of whether the actual rotation speed equivalent value has increased or decreased in accordance with the variation;

obtaining an upper limit deviation, the upper limit deviation being a deviation of a set upper limit output of the gas turbine with respect to an actual output of the gas turbine;

obtaining a lower limit deviation, the lower limit deviation being a deviation of the actual output of the gas turbine with respect to a set lower limit output of the gas turbine;

and changing any one of the target value, the actual rotation speed equivalent value, and the target value deviation such that the target value deviation decreases in a case where the actual rotation speed equivalent value has decreased when the upper limit deviation is smaller than a first previously determined value, and the target value deviation increases in a case where the actual rotation speed equivalent value has increased when the lower limit deviation is smaller than a second previously determined value;

and determining a fuel equivalent value that is equivalent to a flow rate of fuel supplied to the gas turbine in accordance with the target value deviation such that the fuel equivalent value decreases and the actual output of the gas turbine remains below the set upper limit output in a case where the target value deviation decreases, and the fuel equivalent value increases and the actual output of the gas turbine remains above the set lower limit output in a case where the target value deviation increases.

10. The fuel control method for the gas turbine according to claim 9, wherein changing said any one of the target value, the actual rotation speed equivalent value, and the target value deviation includes:

correcting a proportional gain by decreasing the proportional gain in the case where the actual rotation speed equivalent value has decreased when the upper limit deviation is smaller than the first previously determined value, and increasing the proportional gain in the case where the actual rotation speed equivalent value has increased when the lower limit deviation is smaller than the second previously determined value;

multiplying the target value deviation by the corrected proportional gain to obtain a corrected target value deviation; and outputting the corrected target value deviation as the fuel equivalent value.

11. The fuel control method for the gas turbine according to claim 9, wherein outputting the target value includes;

limiting a target output of the gas turbine by outputting, as a limited target output a smaller one of (a) a larger one of (i) a previously received target output of the gas turbine and (ii) the set lower limit output and (b) the set upper limit output, obtaining an output deviation, the output deviation being a deviation of the limited target output with respect to the actual output of the gas turbine, and obtaining the target value that is equivalent to the target rotation speed of the gas turbine based on the output deviation.

12. The fuel control method for the gas turbine according to claim 11, wherein obtaining the target value includes:

obtaining the target value in accordance with the output deviation by using an arbitration rate showing a rotation speed-output relationship.

13. The fuel control method for the gas turbine according to claim 9, further comprising:

creating a valve opening degree command in accordance with the decreased fuel equivalent value that is determined in accordance with the decreased target value deviation, or in accordance with the increased fuel equivalent value that is determined in accordance with the increased target value deviation; and outputting the valve opening degree command to a fuel regulation valve that regulates the flow rate of the fuel supplied to the gas turbine to stabilize the actual rotation speed of the gas turbine.

14. The fuel control method for the gas turbine according to claim 9, wherein changing said any one of the target value, the actual rotation speed equivalent value, and the target value deviation includes:

correcting the target value such that the target value decreases in the case where the actual rotation speed equivalent value has decreased when the upper limit deviation is smaller than the first previously determined value, and the target value increases in the case where the actual rotation speed equivalent value has increased when the lower limit deviation is smaller than the second previously determined value;

multiplying the target value deviation by a proportional gain to obtain a corrected target value deviation, the target value deviation being a deviation of the corrected target value with respect to the actual rotation speed equivalent value; and outputting the corrected target value deviation as the fuel equivalent value.

15. The fuel control method for the gas turbine according to claim 9, wherein changing said any one of the target value, the actual rotation speed equivalent value, and the target value deviation includes:

correcting the actual rotation speed equivalent value such that the actual rotation speed equivalent value decreases in the case where the actual rotation speed equivalent value has decreased when the upper limit deviation is smaller than the first previously determined value, and the actual rotation speed equivalent value increases in the case where the actual rotation speed equivalent value has increased when the lower limit deviation is smaller than the second previously determined value;

multiplying the target value deviation by a proportional gain to obtain a corrected target value deviation, the target value deviation being a deviation of the target value with respect to the corrected actual rotation speed equivalent value; and outputting the corrected target value deviation as the fuel equivalent value.

* * * * *